(12) United States Patent
Kanematsu

(10) Patent No.: US 6,887,294 B2
(45) Date of Patent: May 3, 2005

(54) DIESEL PARTICULATE FILTER APPARATUS

(75) Inventor: Osamu Kanematsu, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 105 days.

(21) Appl. No.: 10/397,848

(22) Filed: Mar. 27, 2003

(65) Prior Publication Data

US 2003/0217535 A1 Nov. 27, 2003

(30) Foreign Application Priority Data

Mar. 28, 2002 (JP) .................................. P2002-091293

(51) Int. Cl.[7] .............................................. B01D 46/00
(52) U.S. Cl. .................. 55/418; 55/282.3; 55/385.3; 55/434; 55/465; 55/495; 55/523; 55/DIG. 30; 60/311
(58) Field of Search .................... 55/282.3, 385.3, 55/418, 434, 462, 465, 495, 523, DIG. 10, DIG. 30; 60/272, 311, 324

(56) References Cited

U.S. PATENT DOCUMENTS

| | | | | |
|---|---|---|---|---|
| 1,752,038 A | * | 3/1930 | Sunday .................. | 55/DIG. 30 |
| 3,749,130 A | * | 7/1973 | Howitt et al. .................. | 55/418 |
| 4,318,720 A | | 3/1982 | Hoggatt | |
| 4,634,459 A | * | 1/1987 | Pischinger et al. ............ | 55/418 |
| 4,851,015 A | | 7/1989 | Wagner et al. | |
| 5,058,381 A | * | 10/1991 | Christenson et al. .......... | 60/311 |
| 5,828,013 A | | 10/1998 | Wagner et al. | |
| 6,090,175 A | * | 7/2000 | Richard ........................ | 55/418 |
| 6,712,869 B2 | * | 3/2004 | Cheng et al. .................. | 55/418 |
| 6,767,378 B2 | * | 7/2004 | Nishiyama et al. ............ | 55/418 |

FOREIGN PATENT DOCUMENTS

| | | | |
|---|---|---|---|
| GB | 1 205 315 | 9/1970 | |
| GB | 2 002 450 A | 2/1979 | |
| JP | 53-51536 | 5/1978 | |
| JP | 4-43807 A | 2/1992 | |
| JP | 2579574 Y2 | 6/1998 | |
| JP | 2003-49634 | * 2/2003 | ............. F01N/3/02 |
| JP | 2003-049634 A | 2/2003 | |

* cited by examiner

Primary Examiner—Duane Smith
Assistant Examiner—Jason M. Greene
(74) Attorney, Agent, or Firm—Foley & Lardner LLP

(57) ABSTRACT

A DPF apparatus includes: a container; an exhaust inlet pipe; a diesel particulate filter; a pair of perforated plugs; a pair of partition plates; and a diffusion chamber. The exhaust inlet pipe is inserted into the container and having openings formed in a pipe wall thereof. The diesel particulate filter is disposed inside the container. The perforated plugs are separately disposed inside an end portion of the exhaust inlet pipe. The partition plates have one or more openings and disposed on the pipe wall of the exhaust inlet pipe. The diffusion chamber is defined by an inner wall face of the container, the perforated plugs, the partition plates, and the pipe wall of the exhaust inlet pipe.

8 Claims, 7 Drawing Sheets

FIG. 4A
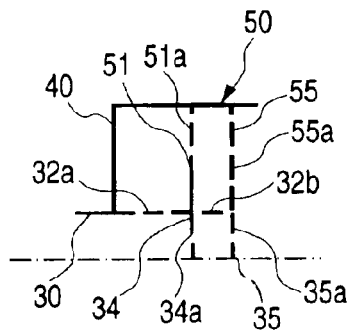
FIG. 4B UNIFORM FLOW
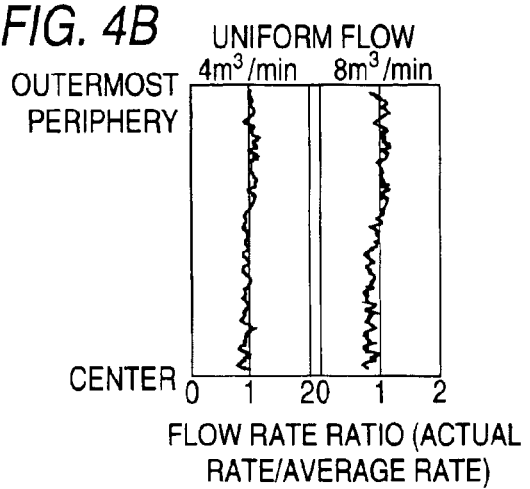
FIG. 5A
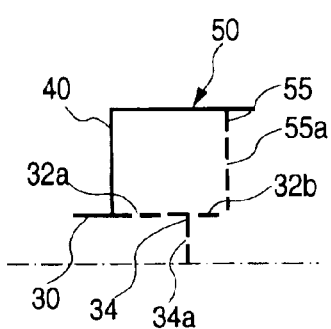
FIG. 5B CENTRAL FLOW
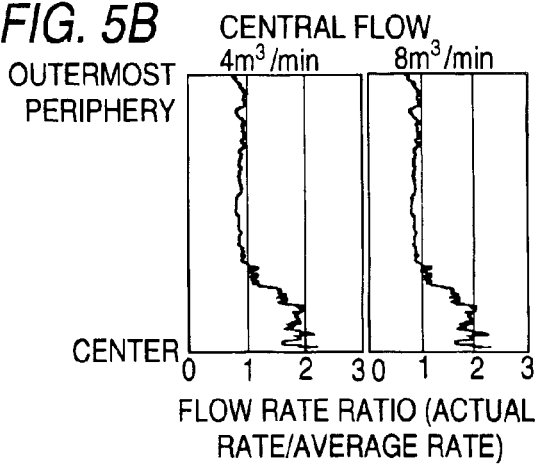
FIG. 6A
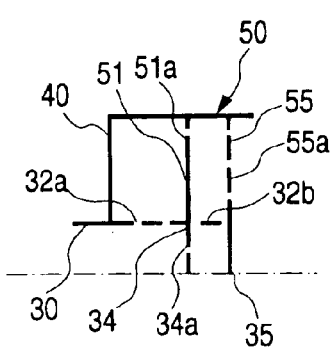
FIG. 6B PERIPHERAL FLOW
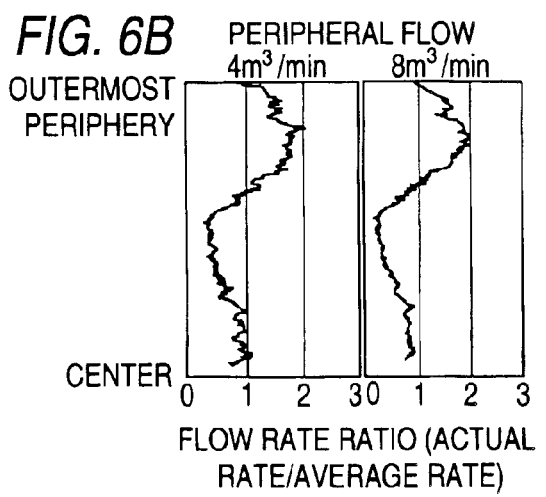

*(PRIOR ART)*

*(PRIOR ART)*

DIESEL PARTICULATE FILTER APPARATUS

The present disclosure relates to the subject matter contained in Japanese Patent Application No. 2002-091293 filed on Mar. 28, 2002, which is incorporated herein by reference in its entirety.

BACKGROUND OF THE INVENTION

1. Field of the Invention

The present invention relates to a diesel particulate filter apparatus.

2. Description of the Related Art

Conventionally, as a diesel particulate filter apparatus (hereinafter referred to as "DPF apparatus"), there is an apparatus in which a diesel particulate filter (hereinafter referred to as "DPF") made of ceramics is held in a container to which an exhaust gas inlet pipe connected to an exhaust gas passage of a diesel engine, and an exhaust gas outlet pipe connected to the downstream side are attached. Exhaust gas which flows into the apparatus through the exhaust gas inlet pipe is passed through a DPF, and is then discharged from the exhaust gas outlet pipe on the downstream side. In such an apparatus, the container has functions of expanding and contracting exhaust gas, and holding the DPF.

In such a DPF apparatus, when soot (diesel particulates) is eccentrically collected in the DPF, the collection performance of the DPF is lowered.

In a regeneration process, when the gas flows ununiformly, the DPF temperature is not even, and hence there is a portion which fails to reach the regeneration temperature.

As a structure for allowing exhaust gas to uniformly flow, there is a diffuser in which the diffusing structure is tapered, or a structure in which a perforated plate having small holes are opened at irregular intervals is disposed in a diffusion chamber.

FIG. 12 shows an example of a diffuser in which the diffusing structure is tapered.

In the DPF apparatus 101, tapered diffusers 103 are disposed in front and rear of a container 102, respectively.

Usually, it is said that, in order to attain an even flow distribution, the diffusers 103 are preferably tapered at 6 degrees so that a gas flow does not separate from a pipe wall.

As shown in FIG. 13, the taper angle must be set small in order to obtain a uniform flow in the diffusers 103. As the expansion ratio of the diameter d1 of an exhaust gas inlet pipe 104 and the diameter d2 of a DPF 105 is larger, the diffusion chamber length L is longer.

When the diffusers 103 are tapered on the basis of the diameter d1 of the exhaust gas inlet pipe 104 and the diameter d2 of the DPF 105, the diffusion chamber length L must be about 1 m. Such a length cannot be practically used.

By contrast, when a perforated plate 108 in which small holes are opened at irregular intervals is disposed in a diffusion chamber 107 as shown in FIGS. 14 and 15, the length of the diffusion chamber can be shortened.

In the configuration where only the perforated plate 108 is employed, because that the amount of exhaust gas of the engine largely changes, there is a problem that in order to equalize the flow rate profile over the whole area (uniformalize the gas flow also in a peripheral portion), the total opening area must be reduced to raise the gas-flow resistance.

The gas flow can be uniformalized also by a three-dimensional structure. However, such a structure requires a complicated design, and hence cannot be practically used.

SUMMARY OF THE INVENTION

The invention has been conducted in order to solve the problems of the conventional art. It is an object of the invention to provide a diesel particulate filter apparatus (DPF apparatus) in which exhaust gas is enabled to uniformly flow through a diesel particulate filter (DPF) without increasing the length of a diffusion chamber and raising the gas-flow resistance.

In order to achieve the object, according to an aspect of the invention, there is provided a diesel particulate filter apparatus including: a container; an exhaust inlet pipe inserted into the container and having openings formed in a pipe wall thereof; a diesel particulate filter disposed inside the container; a plurality of perforated plugs separately disposed inside an end portion of the exhaust inlet pipe; a plurality of partition plates having one or more openings and disposed on the pipe wall of the exhaust inlet pipe; and a diffusion chamber defined by an inner wall face of the container, the perforated plugs, the partition plates, and the pipe wall of the exhaust inlet pipe.

BRIEF DESCRIPTION OF THE DRAWINGS

The above objects and advantages of the present invention will become more apparent by describing in detail preferred exemplary embodiments thereof with reference to the accompanying drawings, wherein:

FIG. 4A is a diagram showing the DPF apparatus of the embodiment, and FIG. 4B is a diagram showing profiles according to the embodiment;

FIG. 5A is a diagram showing a modification of the DPF apparatus, and FIG. 5B is a diagram showing profiles according to the modification;

FIG. 6A is a diagram showing a another modification of the DPF apparatus, and FIG. 6B is a diagram showing profiles according to the modification;

DETAILED DESCRIPTION OF THE PREFERRED EMBODIMENTS

Figure 1:
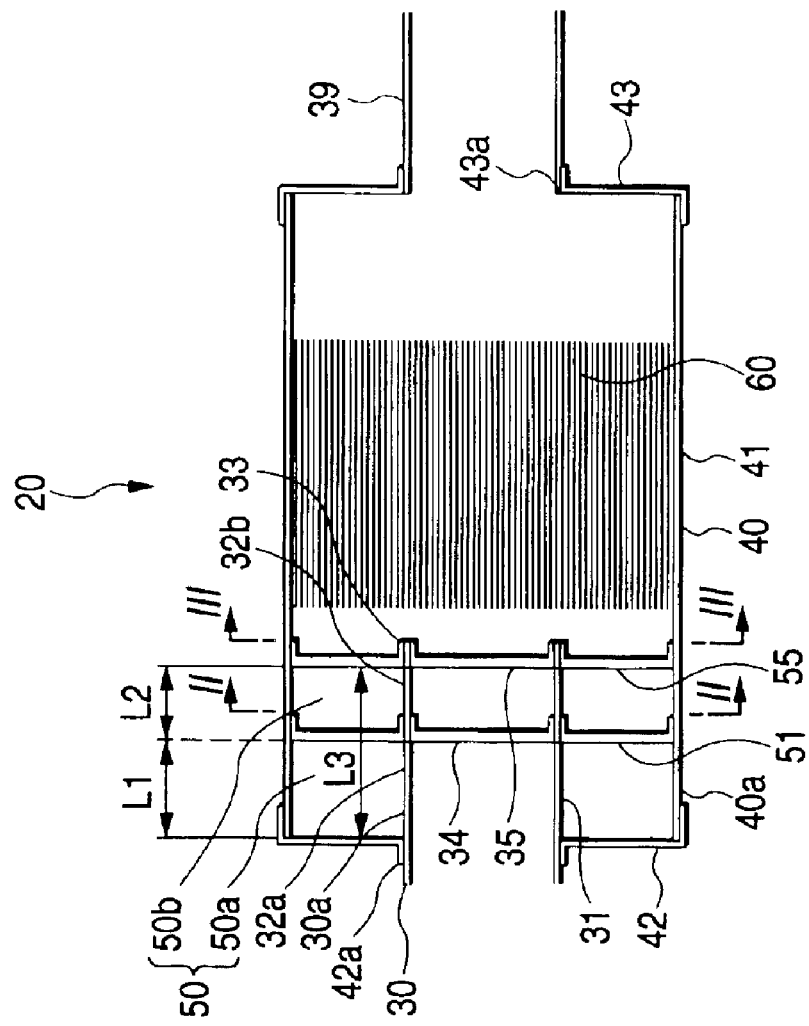
FIG. 1 is a section view of a DPF apparatus a first embodiment of the invention.
Figure 2:
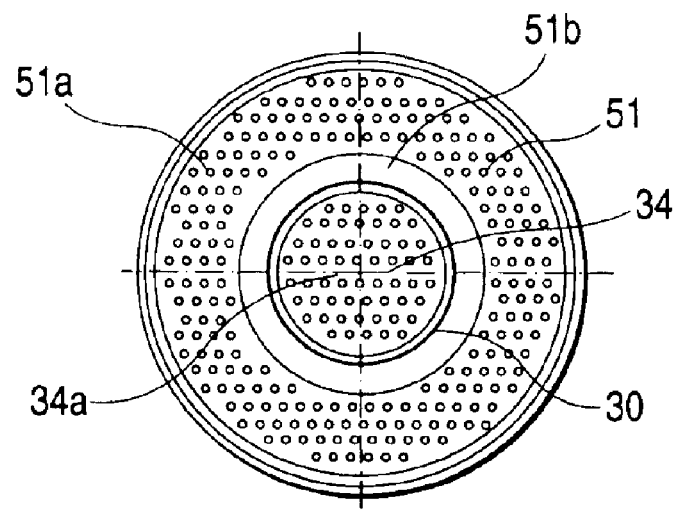
FIG. 2 is a section view of the DPF apparatus taken along the line I—I of FIG. 1.
Figure 3:
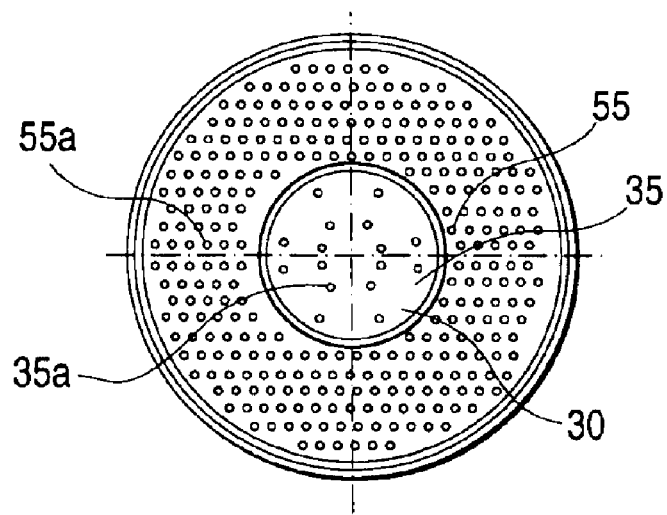
FIG. 3 is a section view of the DPF apparatus taken along the line II—II of FIG. 1.

Referring now to the accompanying drawings, there is shown a preferred embodiment of the invention.

[First Embodiment]

FIGS. 1 to 5 show a diesel particulate filter apparatus 20 (hereinafter referred to as "DPF apparatus 20") of a first embodiment of the invention.

The DPF apparatus 20 of the first embodiment includes a container 40 formed in tube-like shape having rectangle section, an exhaust gas inlet pipe 30 inserted on the upstream side, an exhaust gas outlet pipe 39 disposed on the downstream side, a diffusion chamber 50 disposed on the upstream side in the container 40 and along the exhaust gas inlet pipe 30, a diesel particulate filter 60 (hereinafter referred to as "DPF 60") made of ceramics and disposed in the container 40 downstream of the diffusion chamber 50.

In the diffusion chamber 50, a plurality of openings 32a and 32b are opened in a wall 31 of the exhaust gas inlet pipe 30.

Two perforated plugs 34 and 35 are separately disposed inside an end portion 33 of the exhaust gas inlet pipe 30. The total opening area of openings 34a formed in the perforated plug 34 on the upstream side is larger than that of openings 35a formed in the perforated plug 35 on the side of the DPF 60.

The container 40 is configured by a tubular shell 41, and a pair of end plates 42 and 43 by which a both ends of the tubular shell 41 is closed. Holes 42a and 43a to which the exhaust gas inlet pipe 30 and the exhaust gas outlet pipe 39 are attached are opened in the end plates 42 and 43, respectively.

The diffusion chamber 50 is configured by a primary distribution chamber 50A and a secondary distribution chamber 50B.

The primary distribution chamber 50A is defined by the shell 41 of the container 40, the end plate 42 of the container 40, the exhaust gas inlet pipe 30 which is inserted into the container 40, and the perforated plug 34.

The secondary distribution chamber 50B is defined by the shell 41 of the container 40, the exhaust gas inlet pipe 30 which is inserted into the container 40, the perforated plug 35, and two partition plates 51 and 55 which are disposed on the exhaust gas inlet pipe 30, and which have openings 51a and 55a.

The two partition plates 51 and 55 which are disposed on the exhaust gas inlet pipe 30, and which have the openings 51a and 55a are disposed in positions corresponding to the two perforated plugs 34 and 35, respectively. A plate 51b which partially closes the openings 51a is attached to the partition plate 51.

Each of the two partition plates 51 and 55 having the openings 51a and 55a is configured by a perforated plate (baffle plate) which extends between the exhaust gas inlet pipe 30 and the shell 41 of the container 40.

The total opening area of the openings 51a opened in the partition plate 51 on the upstream side is equal to that of the openings 55a opened in the partition plate 55 on the side of the DPF 60. Specifically, the total opening area is adjusted by partly closing the openings 51a of the partition plate 51 by the plate 51b.

In the exhaust gas inlet pipe 30 in which the openings 32a and 32b are opened in the wall 31 inside the diffusion chamber 50, the total opening area of the openings 32a which are formed in a region between the end plate 42 of the container 40 on the upstream side and the partition plate 51 on the upstream side is larger than that of the openings 32b which are formed in a region between the partition plate 51 on the upstream side and the partition plate 55 on the downstream side.

Next, the function of the embodiment will be described with reference to FIGS. 4A to 7.

FIGS. 4A and 4B shows the diffusion chamber 50 in the DPF apparatus 20 of the first embodiment, and flow profiles according to the structure.

In the first embodiment, it is apparent from FIGS. 4A and 4B that a uniform flow can be attained, and also that, when the diffusion chamber length is about two thirds of the diameter of the diffusion chamber 50, a uniform flow can be attained.

Even when the flow rate was changed from 4 $m^3$/min. to 8 $m^3$/min., the flow profile remained uniform.

FIG. 5A shows an example in which the partition plate 51 of the DPF apparatus 20 of the first embodiment is removed away, and FIG. 5B shows flow profiles according to the structure shown in FIG. 5A.

In the case thus configured, it is apparent from FIG. 5B that the flow is concentrated in the center.

Even when the flow rate was changed from 4 $m^3$/min. to 8 $m^3$/min., the flow profile was not changed.

FIG. 6A shows an example in which the diameter of the plate 51b provided at the partition plate 51 of the DPF apparatus 20 of the first embodiment is increased and modified the perforated plug 35 on the downstream side to be non-perforated, and FIG. 6B shows flow profiles according to the structure shown in FIG. 6A.

In the case thus configured, it is apparent from FIG. 6B that the flow is concentrated in the peripheral portion.

Even when the flow rate was changed from 4 $m^3$/min. to 8 $m^3$/min., the flow profile was not changed.

As described above, it was ascertained that the following can be attained. In the diffusion chamber 50, when the perforated plugs 34 and 35 having the openings 34a and 35a are separately disposed in the exhaust gas inlet pipe 3 and the partition plates 51 and 55 having the openings 51a and 55a are disposed on the exhaust gas inlet pipe 30 and in positions corresponding to the perforated plugs 34 and 35, a uniform flow can be attained as shown in FIG. 4B.

Furthermore, it was ascertained also that the flow profile can be tuned as required.

Figure 7:
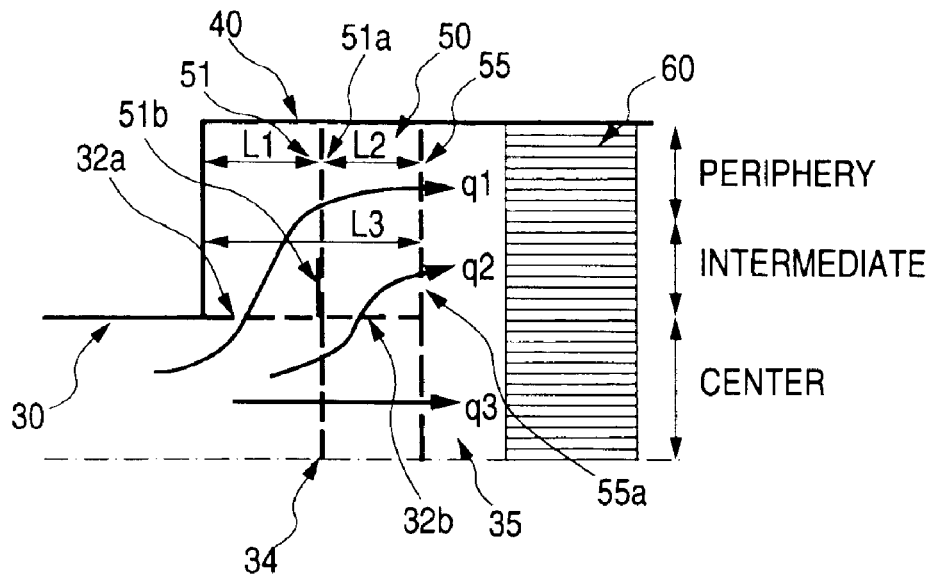
FIG. 7 is a diagram showing exhaust gas flows in the DPF apparatus shown in FIG. 1.

FIG. 7 is an enlarged diagram of main portions of the DPF apparatus 20 of the first embodiment shown in FIG. 1.

Exhaust gas which flows from the exhaust gas inlet pipe 30 into the DPF apparatus 20 of the first embodiment branches to the following three paths.

(A) The exhaust gas having a first flow q1 flows into the primary distribution chamber 50a of the diffusion chamber 50 through the openings 32a formed in the wall 31 of the exhaust gas inlet pipe 30 which is placed upstream of the perforated plug 34, passes through the openings 51a of the partition plate 51 and the openings 55a of the partition plate 55, and then flows into the peripheral portion of the DPF 60.

(B) The exhaust gas having a second flow q2 passes through the openings 34a of the perforated plug 34, flows into the secondary distribution chamber 50B of the diffusion chamber 50 through the openings 32b formed in the wall 31 of the exhaust gas inlet pipe 30, passes through the openings 55a of the partition plate 55, and then flows into an intermediate portion between the peripheral and central portions of the DPF 60.

(C) The exhaust gas having a third flow q3 passes through the openings 34a of the perforated plug 34 and the openings 35a of the perforated plug 35, and then flows into the central portion of the DPF 60.

These flows branch in the following manners:
(1) the gas branches in q1:(q2+q3);
(2) the gas branches in q2:q3; and
(3) the gas branches in (q1+q2):q3.

When influences of the downstream side are neglected, the branching of the flows above listed can be paraphrased as follows.

(1) (The total opening area of the openings 32a formed in the wall 31 of the exhaust gas inlet pipe 30): (The total opening area of the openings 34a formed in the perforated plug 34)

(2) (The total opening area of the openings 32b formed in the wall 31 of the exhaust gas inlet pipe 30): (The total opening area of the openings 35a formed in the perforated plug 35)

The ratio of q1 and q2 is determined by the partition plate 51 and the plate 51b juxtaposed thereto in accordance with the total sectional area.

The branch ratios of the flows are adjusted by the opening ratios of the openings 32a and 32b formed in the wall 31 of the exhaust gas inlet pipe 30, the openings 34a formed in the perforated plug 34, the openings 35a formed in the perforated plug 35, the openings 51a formed in the partition plate 51, and the openings 55a formed in the partition plate 55.

By changing the ratios of the branch flows, the flow distribution can be formed.

The ratios of the branch flows are determined in the following manner:

(1) "q1:q2+q3" is determined by the total opening area of the openings 51a formed in the partition plate 51 and the total opening area of the openings 34a formed in the perforated plug 34; and (2) "q2:q3" is determined by the total opening area of the openings 55a formed in the partition plate 55 and the total opening area of the openings 35a formed in the perforated plug 35.

In order to cause the first flow q1 to be distributed to the peripheral portion of the DPF 60, the plate 51b is juxtaposed to the inner peripheral portion of the partition plate 51 to set an non-perforated area.

The branch ratios of the flows q1, q2, and q3 are determined by the sectional area ratio of the openings 32a and 32b formed in the wall 31 of the exhaust gas inlet pipe 30, the openings 34a formed in the perforated plug 34, the openings 35a formed in the perforated plug 35, the openings 51a formed in the partition plate 51, the openings 55a formed in the partition plate 55, and the plate 51b.

Assumed passing areas of q1 (peripheral flow=(sectional area of baffle)/2), q2 (intermediate flow=(sectional area of baffle)/2), and q3 (central flow=sectional flow of pipe) are determined by the sectional area of the DPF 60.

In this case, the central flow is set so as to correspond to the inner diameter of the exhaust gas inlet pipe 30, and the remaining region is distributed in proportion to the intermediate flow and the peripheral flow according to the diameter.

In the first embodiment, the sectional area ratio is set as follows: q1:q2:q3=6:3:1.

Next, the perforated plugs 34 and 35 are placed so that the capacity ratio of the primary distribution chamber 50A and the secondary distribution chamber 50B is approximately equal to {peripheral flow:(intermediate flow+central flow)}.

In the first embodiment, the ratio is set as follows: 6:(3+1)=1.5:1.

In the first embodiment, as shown in FIG. 7, the perforated plug 34 is placed at a position where the perpendicular distance from the end plate 42 is L1, and the perforated plug 35 is placed at a position where the perpendicular distance from the perforated plug 34 is L2.

The opening ratios of the openings 32a formed in the wall 31 of the exhaust gas inlet pipe 30, the openings 34a formed in the perforated plug 34, the openings 32b formed in the wall 31 of the exhaust gas inlet pipe 30, and the openings 35a formed in the perforated plug 35 are set so as to approximately correspond to the sectional area ratio of the respective flow area.

In the first embodiment, the following ratios are attained: (the opening ratio of the openings 32a formed in the wall of the exhaust gas inlet pipe 30):(the opening ratio of the openings 34a formed in the perforated plug 34)=1.5:1, and (the opening ratio of the openings 32b formed in the wall 31 of the exhaust gas inlet pipe 30):(the opening ratio of the openings 35a formed in the perforated plug 35)=3:1.

The flows tend to be directed along the axial direction of the container 40. Therefore, the number of the openings 32a and 32b formed in the wall of the exhaust gas inlet pipe 30 must be relatively larger than that of the openings 34a and 35a formed in the perforated plugs 34 and 35. According to experiments, satisfactory results were obtained when (the number of the openings 32a formed in the wall 31 of the exhaust gas inlet pipe 30):(the number of the openings 34a formed in the perforated plug 34)≈1.9:1, and (the number of the openings 32b formed in the wall 31 of the exhaust gas inlet pipe 30):(the number of the openings 35a formed in the perforated plug 35)=12:1.

It seems that the number of the openings 35a formed in the perforated plug 35 have a relatively small value because that the flow passes the perforated plug 35 is mainly consist of component flow parallel to the axial direction of the container 40.

In the first embodiment, the small holes formed in the perforated plugs 34 and 35 are formed to have a diameter of 4.0 mm.

In order to balance the gas-flow resistance, the miniaturization, and the distribution performance, the overall length L3 of the diffusion chamber 50 is preferably selected to be in the range of ½±20% of the outer diameter of the DPF 60.

As described above, according to the first embodiment, the diffusion chamber 50 is mounted to the upstream side of the DPF 60 to uniformly disperse exhaust gas flowing through the exhaust gas inlet pipe 30 to a section of the DPF 60, whereby soot can be evenly collected by the whole face of the DPF 60. As a result, the collection performance can be improved.

Furthermore, the heat of exhaust gas is uniformly transmitted to the whole face of the DPF 60 in the first embodiment. Therefore, the temperature distribution in the DPF 60 can be uniformalized, and the amount of unburned soot in the recirculation process can be reduced.

Since a three-point support structure in which the exhaust gas inlet pipe 30 is inserted into the container 40 and supported by the hole 42a of the end plate 42, and the two partition plates 51 and 55 is formed, stresses caused by input vibrations are scattered to these support points. Therefore, the apparatus can be prevented from being damaged by stress concentration on a portion supporting the exhaust gas inlet pipe 30.

In a portion where the cross section is suddenly changed, such as that where the exhaust gas inlet pipe 30 is joined to the container 40, a flow in the vicinity of the wall face separates therefrom after the cross section is changed, and eddies are repeatedly generated and extinguished. Because of the generation and extinction of eddies, secondary sound which is called flow noise is generated.

In the present embodiment, the exhaust gas inlet pipe 30 is inserted into the diffusion chamber 50, and the openings 32a and 32b are opened in the inserted region. Because of the cross section change due to blowout through the openings 32a and 32b, eddies caused by separation from the wall face are not generated, and hence the generation of flow noise can be suppressed.

In the first embodiment, the partition plate 51 is identical with the partition plate 55, and the total opening area is adjusted by the plate 51b. Alternatively, a discrete partition plate 51 in which the openings 51a are not formed in the region corresponding to the plate 51b may be used.

[Second Embodiment]

Figure 8:
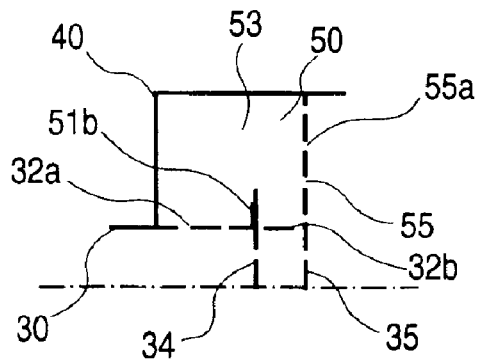
FIG. 8 is a diagram showing a DPF apparatus as a second embodiment of the invention.

FIG. 8 shows a second embodiment of the invention.

The second embodiment is different from the first embodiment in that the partition plate 51 is omitted, but the plate 51b remains to be used.

In the second embodiment, an opening 53 is formed between the plate 51b and the shell 41 of the container 40, and the total opening area of the opening 53 is larger than that of the openings 55a formed in the partition plate 55 on the downstream side.

Therefore, the second embodiment can attain the same effects as those of the first embodiment.

[Third Embodiment]

Figure 9:
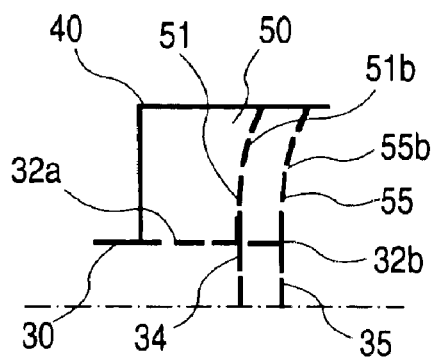
FIG. 9 is a diagram showing a DPF apparatus as a third embodiment of the invention.

FIG. 9 shows a third embodiment of the invention.

The embodiment is different from the first embodiment in that reinforcement beads 51b and 55b are formed on the partition plates 51 and 55, respectively.

According to the third embodiment, the mechanical strength such as rigidity of the partition plates 51 and 55 can be enhanced.

[Fourth Embodiment]

Figure 10:
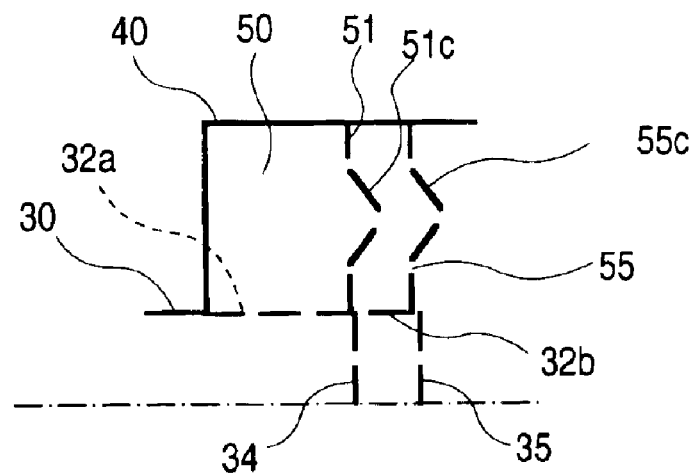
FIG. 10 is a diagram showing a DPF apparatus as a fourth embodiment the invention.

FIG. 10 shows a fourth embodiment of the invention.

The fourth embodiment is different from the first embodiment in that reinforcement beads 51c and 55c are formed on the partition plates 51 and 55, respectively.

According to the fourth embodiment, the mechanical strength such as rigidity of the partition plates 51 and 55 can be enhanced.

[Fifth Embodiment]

Figure 11:
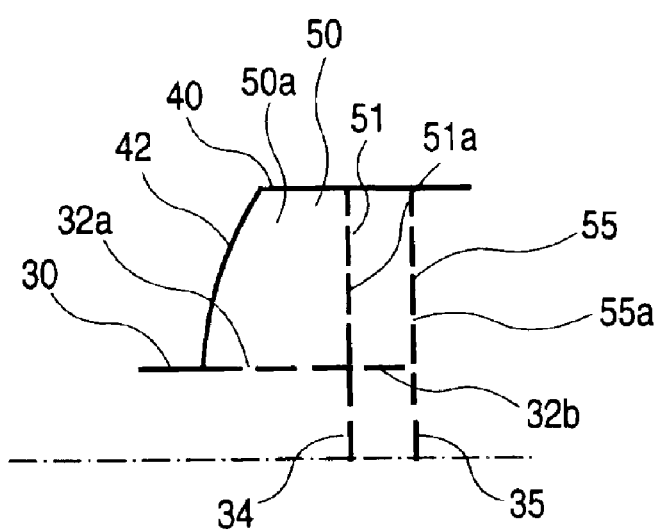
FIG. 11 is a diagram showing a DPF apparatus as a fifth embodiment of the invention.
Figure 12:
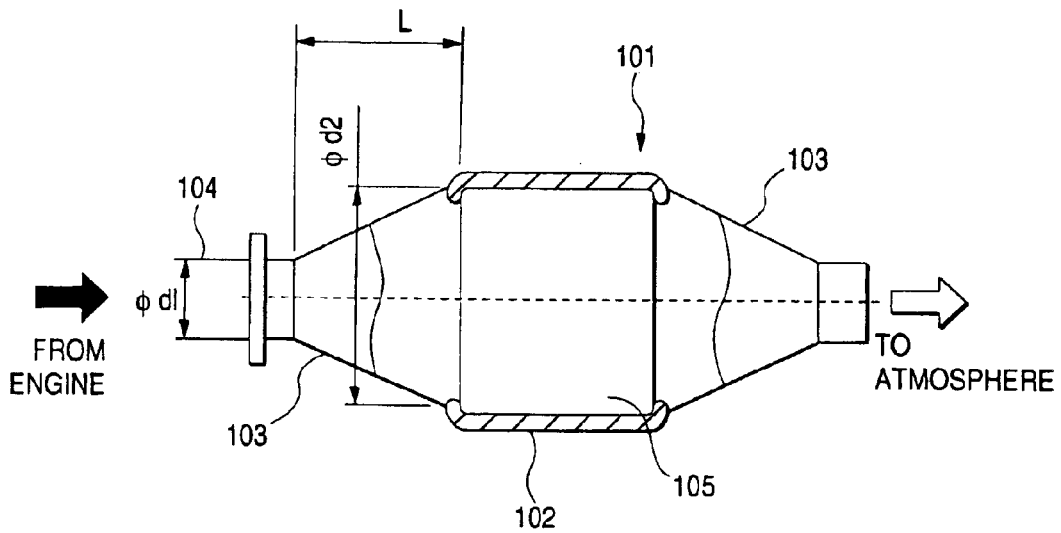
FIG. 12 is a view showing a conventional DPF apparatus.
Figure 13:
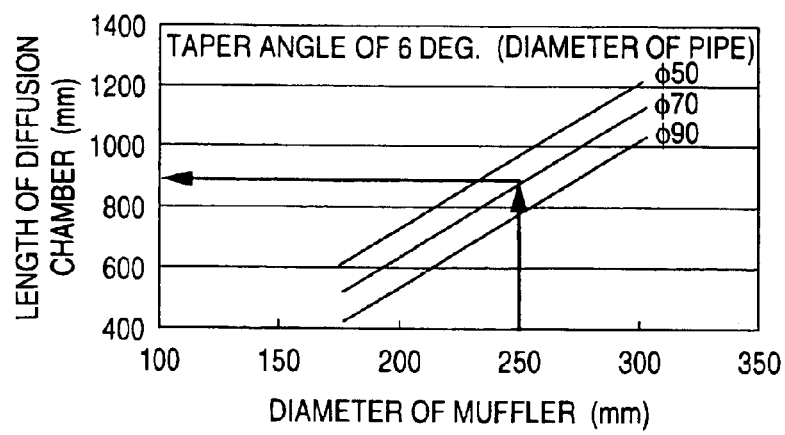
FIG. 13 is a view showing relationships between the diameter of a muffler and the length of an expansion chamber.
Figure 14:
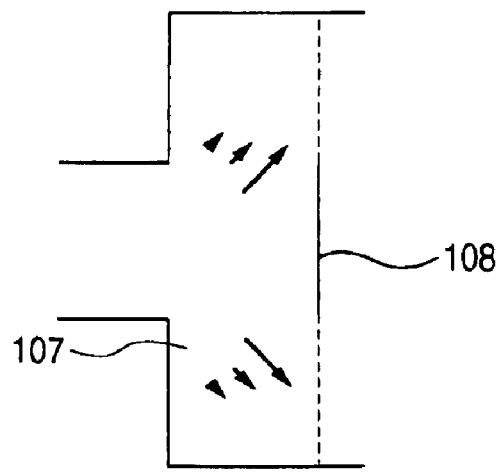
FIG. 14 is a view showing another conventional DPF apparatus.
Figure 15:
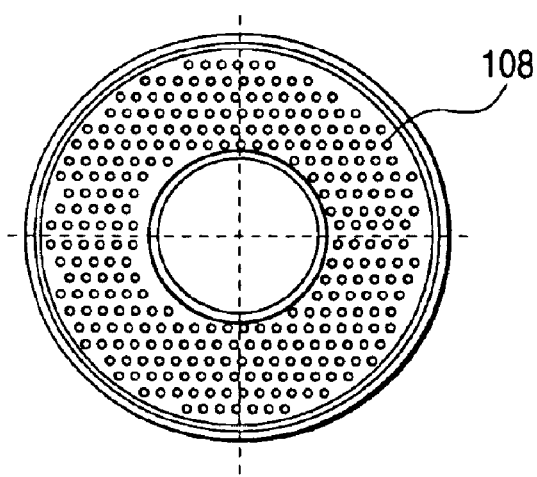
FIG. 15 is a view showing a perforated plate shown in FIG. 14.

FIG. 11 shows a fifth embodiment of the invention.

The fifth embodiment is different from the first embodiment in that the end plate 42 of the container 40 on the upstream side is formed to have a curved surface.

According to the fifth embodiment, the dead space formed in the vicinity of the end plate 42 on the upstream side is eliminated, and exhaust gas can smoothly flow through the primary distribution chamber 50a.

Since the end plate 42 on the upstream side has a curved surface, the mechanical strength such as rigidity of the end plate 42 can be enhanced.

According to the invention, exhaust gas is enabled to uniformly flow through a DPF without increasing the length of a diffusion chamber and raising the gas-flow resistance.

Moreover, as compared with a conventional diffuser structure, the length of a diffusion chamber can be shortened.

Furthermore, the amounts of flows in peripheral and central portions can be easily increased with setting a uniform distribution as the base.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A diesel particulate filter apparatus comprising:
   a container;
   an exhaust inlet pipe inserted into the container and having openings formed in a pipe wall thereof;
   a diesel particulate filter disposed inside the container;
   a plurality of perforated plugs separately disposed inside an end portion of the exhaust inlet pipe;
   a plurality of partition plates having one or more openings and disposed on the pipe wall of the exhaust inlet pipe; and
   a diffusion chamber defined by an inner wall face of the container, the perforated plugs, the partition plates, and the pipe wall of the exhaust inlet pipe.

2. The diesel particulate filter apparatus as claimed in claim 1,
   wherein the partition plates are disposed in positions corresponding to the perforated plugs, respectively.

3. The diesel particulate filter apparatus as claimed in claim 1,
   wherein a total opening area of the perforated plug disposed on upstream side is larger than that of the perforated plug disposed on downstream side.

4. The diesel particulate filter apparatus as claimed in claim 1,
   wherein at least one of the partition plates comprises a perforated plate disposed between the pipe wall of the exhaust gas inlet pipe and the inner wall face of the container.

5. The diesel particulate filter apparatus as claimed in claim 4,
   wherein a total opening area of the perforated plate disposed on the upstream side is larger than that of the perforated plate disposed on a downstream side.

6. The diesel particulate filter apparatus as claimed in claim 1,
   wherein the partition plates include:
   a first partition plate which extends from the pipe wall of the exhaust gas inlet pipe, and in which one or more openings are formed in a range between the pipe wall of the exhaust gas inlet pipe and the inner wall face of the container, the first partition plate being disposed on upstream side; and
   a second partition plate configured by a perforated plate which extends between the pipe wall of the exhaust gas inlet pipe and the inner wall face of the container, the second partition plate being disposed on downstream side.

7. The diesel particulate filter apparatus as claimed in claim 6,
   wherein a total opening area of the first partition plate is larger than that of the second perforated plate.

8. The diesel particulate filter apparatus as claimed in claim 1,
   wherein the exhaust gas inlet pipe is formed so as to have a total opening area of the openings which are formed in a region between the inner wall face of the container on the upstream side and the partition plate disposed on the upstream side is larger than that of openings which are formed in a region between the partition plate disposed on the upstream side and the partition plate disposed on the downstream side.

* * * * *